6368X
Fox & Borland.
Thrashing Mach.
Patented Feb. 8, 1831.
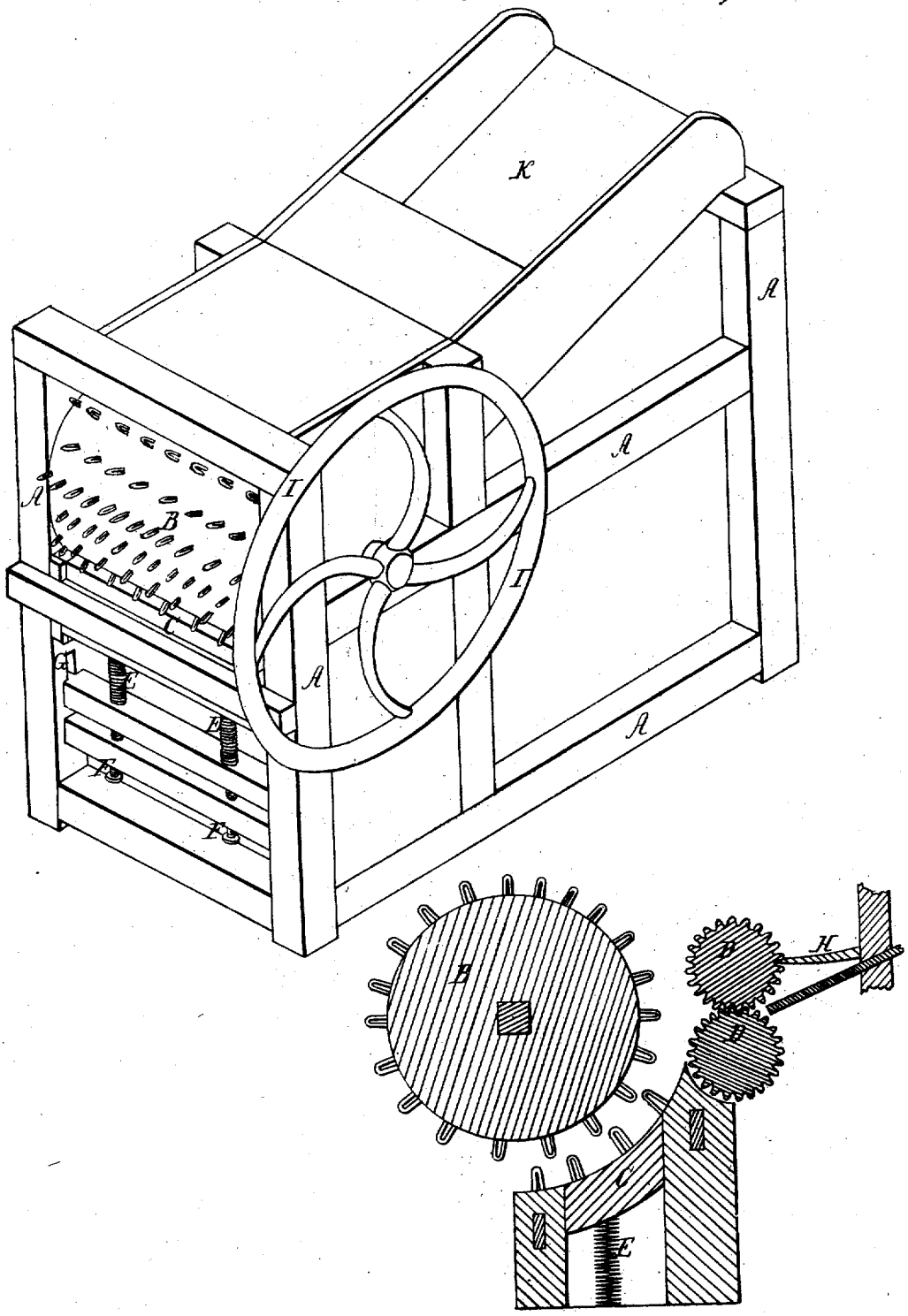

Copied from a Print.

Truman Fox and William G. Borland.

---

The Schedule referred to in these Letters Patent, and making part of the same, containing a description, in the words of the said Truman Fox and William G. Borland themselves, of their improvement in the Thrashing Machine:

Be it known, That we Truman Fox an William G. Borland, of the Town of Little Falls, in the County of Herkimer, and State of New York, have invented a new and useful improvement in the Thrashing Machine; and that the following is a full and exact description of the construction and operation of the said machine as invented or improved by us, to wit:

A frame constructed of four posts each - - - about three feet long, in which are framed four side girths, two on each side, about four feet in length; the lower girths are framed in the posts about six inches from the bottom, and the top girths about one foot eight inches above the lower ones. At the forward end of the machine are framed two planks, one on each side, one foot and four inches wide, one foot and eight inches in length and two inches thick, to be proportioned to the size of the cylinder hereinafter mentioned; on the inner side of each of these plank are two long mortises perpendicularly made and running parallel with each other, ten inches apart, and from three to five inches in length; in the centre of each of these plank on the inner side, at a central point between the two mortises above described, is another mortise commencing at the bottom of the plank and extending from three to five inches upward. A cross sill is framed on the bottom of the forward posts; also a cap piece is framed across the top of the same posts. On the hind end of the frame is framed a cross piece about one foot from the bottom of the posts; on the top of these posts at each end of the machine is framed a cap piece across the machine.

The medium size of the frame is between two feet six inches and three feet in width, and between four and five feet in length. A cylinder is placed near the forward end of the frame; this cylinder is between one foot and one foot eight inches in diameter, and is made of wood in solid form or by means of two or more circular heads covered with staves about three inches thick; through the center of this cylinder passes an iron shaft with its journals resting in boxes on the top girths on each side of the frame; on one end of this shaft is placed a whirl between eight and ten inches in diameter and on the opposite end of this shaft is placed a fly or balance wheel of cast iron, between three feet and three feet six inches in diameter, and weighing between one hundred and fifty and two hundred pounds. In the cylinder are inserted staple teeth projecting from the surface of the cylinder between one and two inches; these teeth are made of large wire, (number one or two) or of braziers' rods, and they may be round, square or diamonding; the teeth are inserted in rows lengthwise of the cylinder, the rows being between two inches and a half and three inches apart, and the teeth in the rows the same distance apart. These teeth are so put in, by omission in one row and insertion in another, that a space left for instance in the first row is supplied by insertions in the second and third rows, and so on till the whole cylinder is filled; these teeth, when the cylinder is in motion, pass through teeth also inserted in the concave bed below the cylinder hereinafter described.

Under the cylinder is placed a receding concave bed formed of wood or metal, reaching from the centre of the cylinder below two thirds the distance to the cylinder shaft; there are two tenons on each side of this concave bed, about one third from the centre thereof, which act in the long mortises above described and recede as relief is required. This bed rests upon springs of wood or iron under which is framed a slide on which the springs rest, and beneath the slide is framed a bar or cross piece through which screws are run so as to control the spring in order to regulate the action and position of the concave bed; – this bed can also be regulated by means of a lever and weights as well as springs; staple teeth are inserted in this concave bed projecting the same distance from the surface as in the cylinder, and the teeth are formed of like material and in like manner; they are inserted in 3 or 4 rows in such a manner that the teeth in the cylinder when in motion act closely therewith and pass between them.

Near the summit of the concave bed may be placed (or they may be omitted) two fluted rollers from 3 to 5 inches in diameter, their journals resting in boxes on each side of the frame; on the upper roller springs may be made to press downward on its journals so as to hold the grain while it passes to the operative parts; on one end of the shaft of the upper roller is placed a whirl with different sized grooves to regulate the feeding; also a whirl is placed on the cylinder shaft to which the power to carry the roller is applied.

An inclined box or hopper is placed on the machine, one end resting on the head cap piece and the other placed near the summit of the concave bed; through this box or hopper the grain is introduced to the cylinder and concave bed; a box is also placed over the cylinder which covers it and prevents grain and straw from flying off.

What we claim as new and our own invention and discovery in the above describe

63368x Feb 8, 1831 machine, and for the use of which we ask and exclusive privilege, is the construction and application of the receding concave bed by means of springs or lever and weights and the staple teeth, together with the fly or balance wheel, which together prevent the machine from clogging and breaking, and produce a uniform motion while it thrashes all kinds of grain.

Witnesses
C. P. Hurlbut
C. S. Benton

Truman Fox
William G. Borland (a Wood cut Drawing on Printed sheet. with references thereto —

Exd. W.G.C.